May 16, 1967    J. L. R. HINES    3,320,585
TIME INFORMING DISPLAY DEVICE
Filed Dec. 23, 1964    5 Sheets-Sheet 1

James L. R. Hines
INVENTOR.

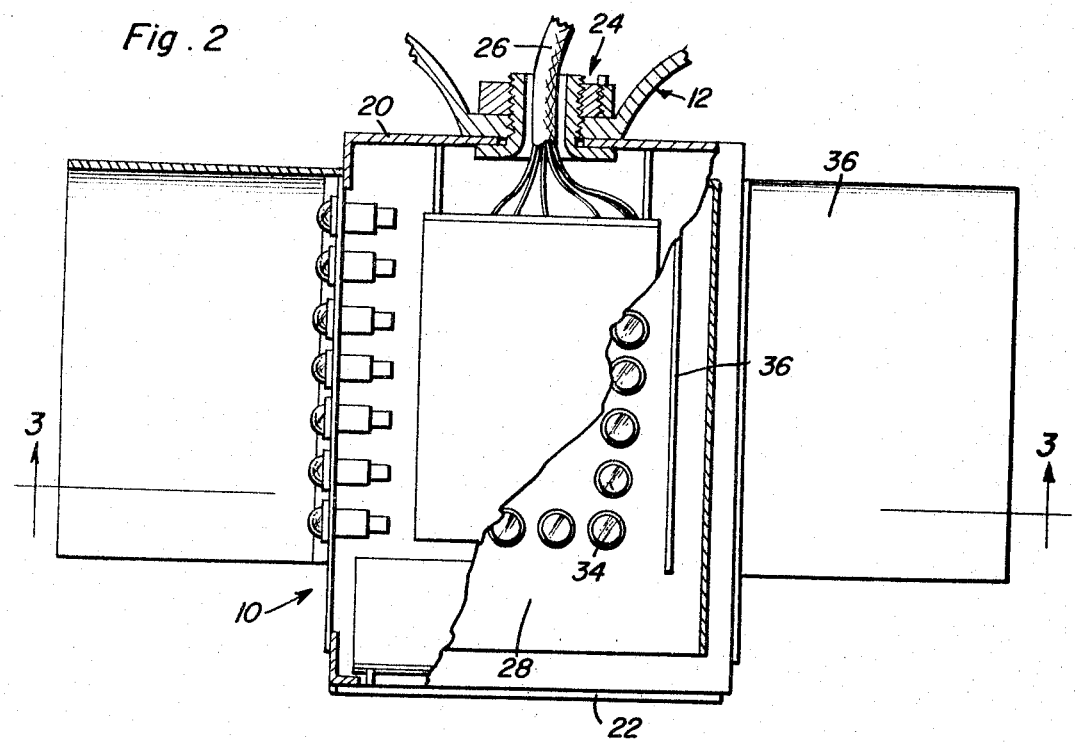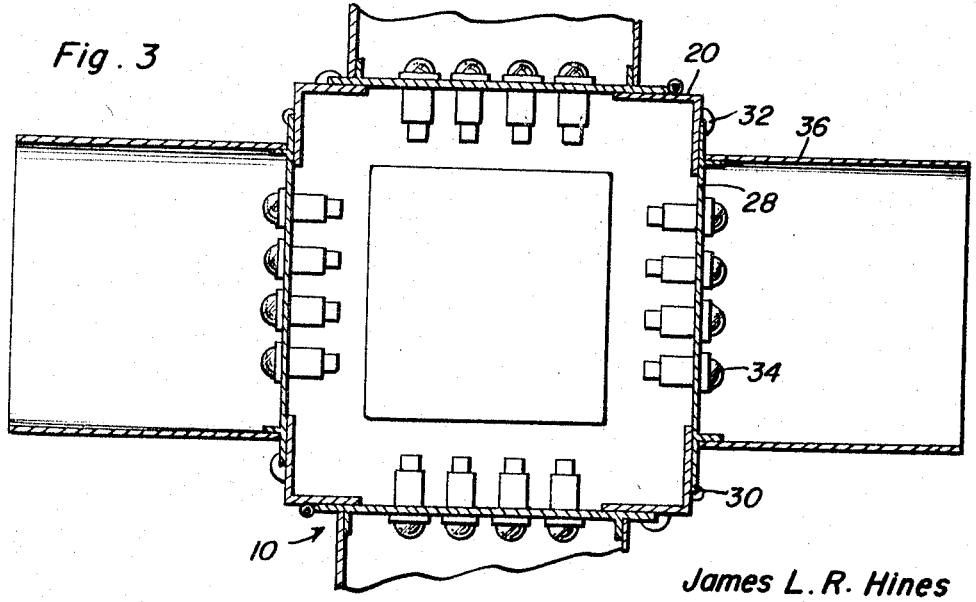

James L. R. Hines
INVENTOR.

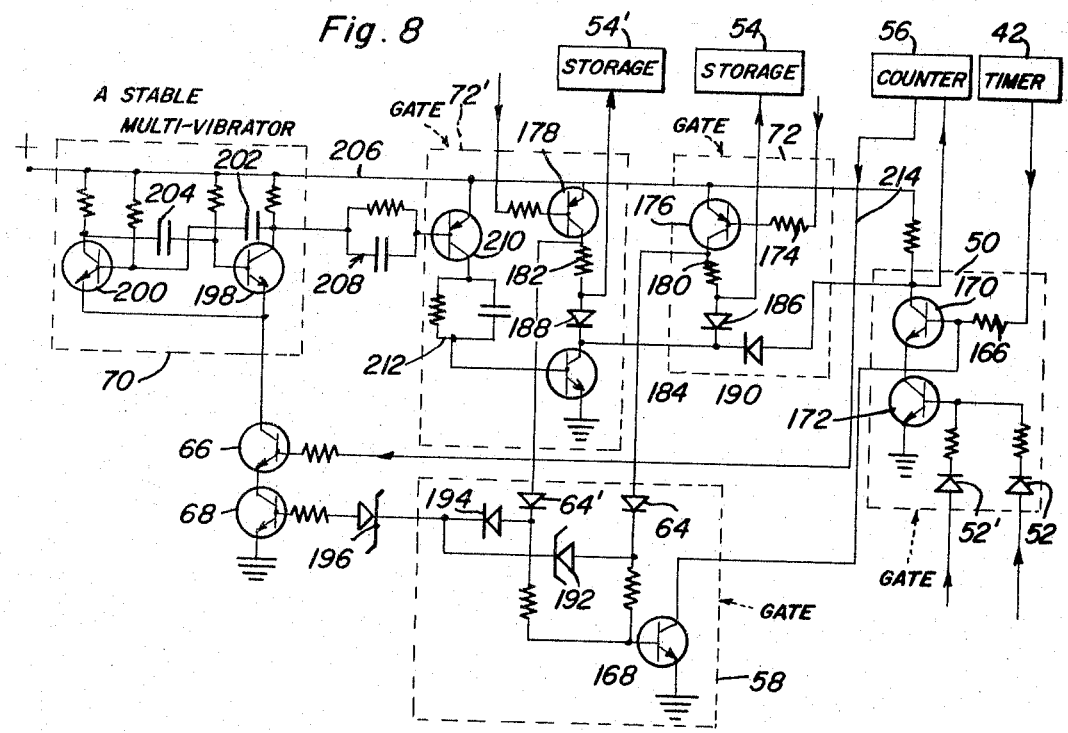
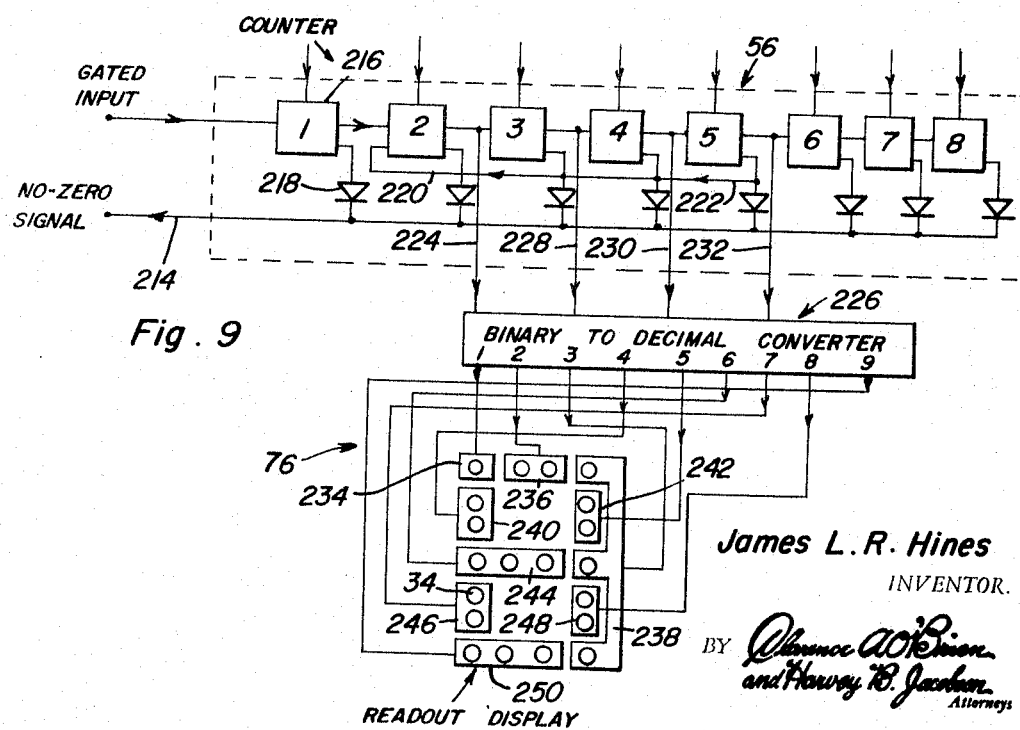

May 16, 1967  J. L. R. HINES  3,320,585
TIME INFORMING DISPLAY DEVICE
Filed Dec. 23, 1964  5 Sheets-Sheet 5
Fig. 10
| NO. | BINARY OUTPUTS | | | |
|---|---|---|---|---|
| | 224 | 228 | 230 | 232 |
| 9 | 0 | 0 | 0 | 0 |
| 8 | 1 | 0 | 0 | 0 |
| 7 | 1 | 1 | 0 | 0 |
| 6 | 0 | 0 | 1 | 0 |
| 5 | 1 | 0 | 1 | 0 |
| 4 | 1 | 1 | 1 | 0 |
| 3 | 0 | 0 | 1 | 1 |
| 2 | 1 | 0 | 1 | 1 |
| 1 | 1 | 1 | 1 | 1 |
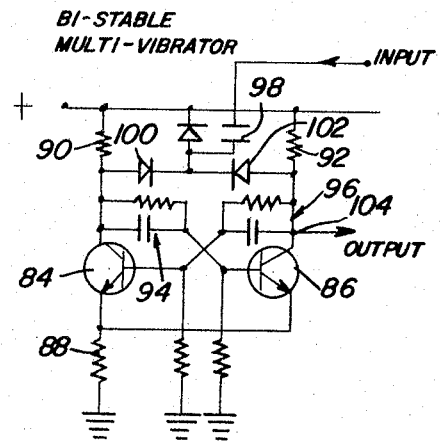
Fig. 11
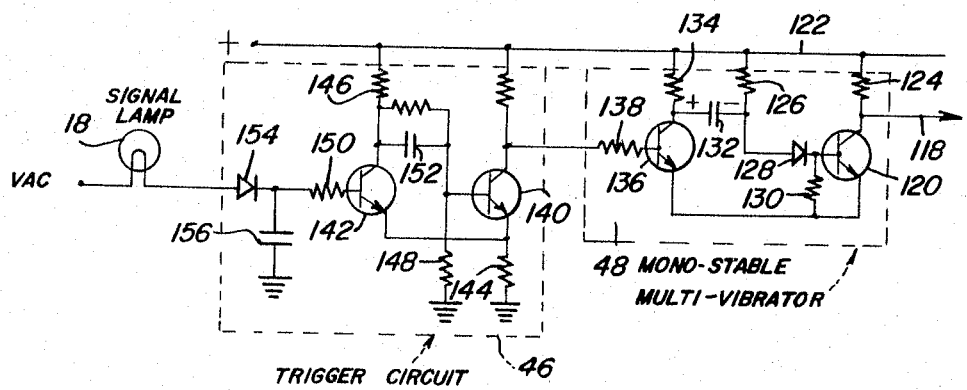
Fig. 12
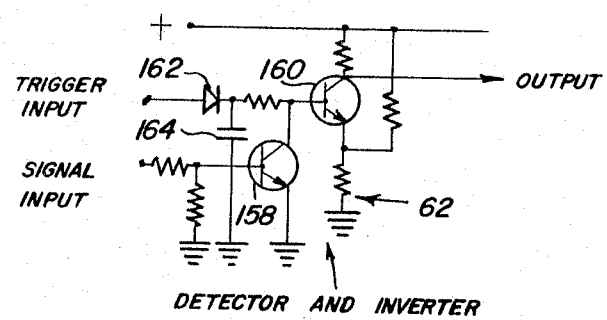
Fig. 13
James L. R. Hines
INVENTOR.
BY James A. O'Brien
and Harvey B. Jacobson
Attorneys

United States Patent Office 3,320,585
Patented May 16, 1967

3,320,585
TIME INFORMING DISPLAY DEVICE
James L. R. Hines, 826 Rivercrest,
Abilene, Tex. 79605
Filed Dec. 23, 1964, Ser. No. 420,716
7 Claims. (Cl. 340—43)

This invention relates to a new and useful attachment for traffic signal lamp assemblies and more particularly to a device which will inform motorists of the time elapsed during the illumination period for one of the traffic signal lamps such as the green signal lamp.

Although time informing display devices of the aforementioned type have heretofore been proposed, operational reliability, cost, and maintenance have been factors in discouraging adoption. These problems have however been overcome by the arrangement of the present invention. The reliance on moving parts such as motors and electromechanical relays has heretofore rendered any proposed time informing display devices both cumbersome, operationally unreliable as well as difficult to maintain in proper operating condition. The use of the moving parts was also necessitated in view of the necessity for establishing the timing intervals for the displayed number characters during the illumination period of the signal lamp so as to inform motorists. In accordance with the present invention however, not only is the number display means energized from the same electrical energy supplied to the traffic signal lamps, but this same electrical energy such as the conventional A.C. current supply is utilized to regulate the timing of the number displays and thereby avoid the use of any moving parts.

It is therefore a primary object of the present invention to provide a time informing display device associated with traffic signalling lamps which operates off the conventional A.C. voltage supplied to the signal lamps and regulates the timing of the number display in accordance with the alternating frequency of the A.C. power supply.

An additional object is to provide a novel solid state computer circuit for controlling the timing as well as converting the timing information into the time informing display.

In accordance with the foregoing objects, the time informing display device involves a multiple bulb presentation from which the decimal number digits are formed when different combinations of the bulbs are illuminated. The illumination of the bulbs is controlled by a solid state electronic circuit involving a time base, gate circuits, storage units, counters and logic circuits for converting binary code information into decimal readout. No external timing information is required since the time base of the control circuit is established from the 60 cycles per second frequency of the conventional A.C. supply from which the traffic signal lamps are energized.

An additional object of the present invention is to provide an electronic control circuit in accordance with the foregoing objects having flexibility as to the length of the illumination period and timing cycle of the traffic signal lamps.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front elevational view of the time informing device with parts broken away and shown in section.

FIGURE 3 is a top sectional view taken substantially through a plane indicated by section line 3—3 in FIGURE 2.

FIGURE 8 is an electrical circuit diagram of a portion of the control system.

FIGURE 9 is a block circuit diagram of the counter, converter and readout device associated with the time informing device.

FIGURE 10 is a chart indicating the binary code pattern associated with the binary-to-decimal converter.

FIGURE 11 is an electrical circuit diagram of a typical bistable multivibrator utilizer in the control system.

FIGURE 12 is an electrical circuit diagram of the trigger circuit and monostable multivibrator utilized in the control system.

FIGURE 13 is an electrical circuit diagram of the detector and inverter circuit utilized in the control system.

Figure 1:
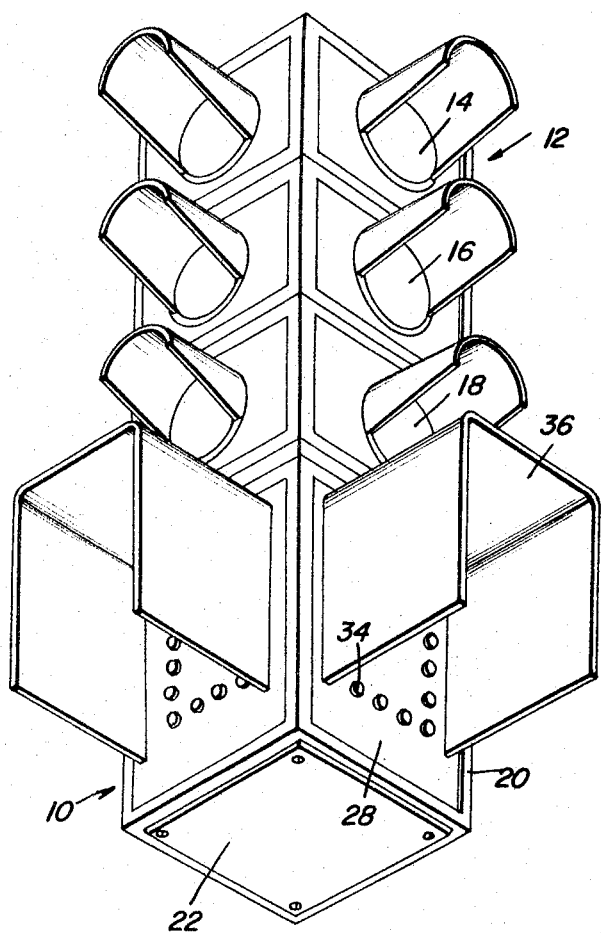
FIGURE 1 is a perspective view of a typical traffic lamp assembly with the time informing device of the present invention installed thereon.
Figure 4:
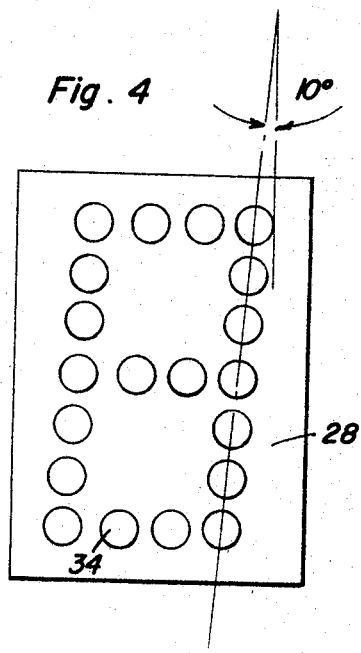
FIGURE 4 is a front elevational view of the time indicating panel.

Referring now to the drawings in detail, it will be observed from FIGURE 1 that the time informing device generally referred to by reference numeral 10 is mounted below a typical traffic signalling lamp assembly generally referred to by reference numeral 12, this type of traffic signalling lamp assembly having three sets of signalling lamps facing four directions including east and west directions and north and south directions for example. Each set of signalling lamps includes therefore, a red light 14, an amber light 16 and a green light 18. As is well known, the traffic signalling lamps 14, 16 and 18 are successively illuminated and extinguished during a predetermined cycle by electrical energy such as an alternating current power supply under control of a programming circuit. The time informing device 10 is also provided with four sides corresponding to the respective sets of three signal lamps.

With continued reference to FIGURE 1 and FIGURES 2-4, it will be observed that the time informing device is housed within an enclosure 20 having a removable bottom wall 22 providing easy access into the enclosure for repair or replacement purposes. The enclosure is secured by any suitable fastener assembly 24 to the bottom of the signal lamp assembly 12, the fastener assembly being arranged to provide an opening through which the electrical conduit 26 extends. The electrical conduit 26 therefore encloses conductors through which electrical connections are made between the control circuit components of the time informing device and the signal lamps of the traffic signalling lamp assembly as well as to supply the electrical energy for operating the time informing device. Each vertical side of the enclosure 20 is provided with a rectangular panel member 28 hingedly mounted by the hinge 30 to the enclosure with any suitable lock device 32 holding the panel member against the enclosure wall. A plurality of bulbs 34 are mounted on the panel member in a geometric arrangement more clearly shown in FIGURE 4. As illustrated, 20 bulbs are utilized and so arranged on the panel member 28 to form a vertically elongated parallelogram divided by a line intermediate the base and top, the longer parallel sides of the parallelogram being disposed at an angle of 10° to the vertical. With such an arrangement of the bulbs, simultaneous illumination of different combinations of the bulbs will form the number characters from one through nine in our decimal system. Each of the display panel members also mounts thereon a protective hood 36 which will facilitate viewing of the numbers displayed on the panel member by avoiding glare.

Figure 14:
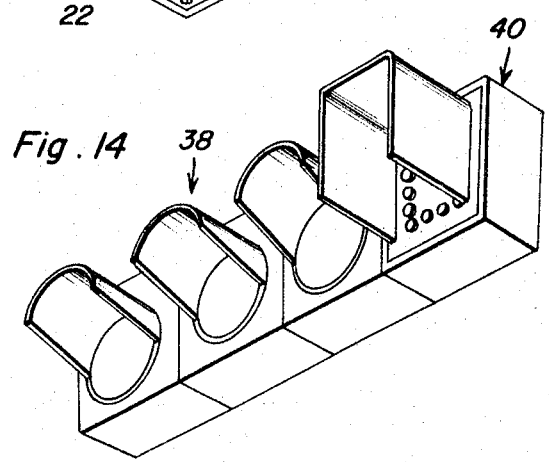
FIGURE 14 is a perspective view of an alternative arrangement of another form of traffic signalling lamp assembly and time informing device.

The time informing device is arranged to operate by displaying the number character 9 at the beginning of the illumination period for the green signal lamp 18. After elapse of a predetermined interval of time such as one second, the number character changes from 9 to 8 on the display panel member. Thus, a reducing number is successively displayed on the panel member to indicate the amount of time remaining within the illumination period of the green signal lamp so that motorists at a distance may estimate from the remaining period of the green lamp illumination whether or not the vehicle should be slowed down or accelerated. At the end of the timing period for the time informing device, the amber or yellow light 16 is illuminated. After the traffic signalling cycle is completed for two sides of the traffic signal assembly, the cycle is repeated and the illuminated display period for the time informing device on the corresponding two sides begins once again. The other two sides of the time informing device will have similar illuminated display periods during the illumination period of the corresponding green signal lamps which of course occurs during the illumination period of the red signal lamps 14 on the other two sides. It will of course be appreciated that a traffic signal assembly 38 such as shown in FIGURE 14 having one side, will correspondingly have a time informing device 40 with only a single display side so that the control circuitry housed therewithin may correspondingly be operated by less components. In any case, the operational sequence for the two perpendicular directions associated with the signal lamp assembly 12 will be the same.

Figure 5:
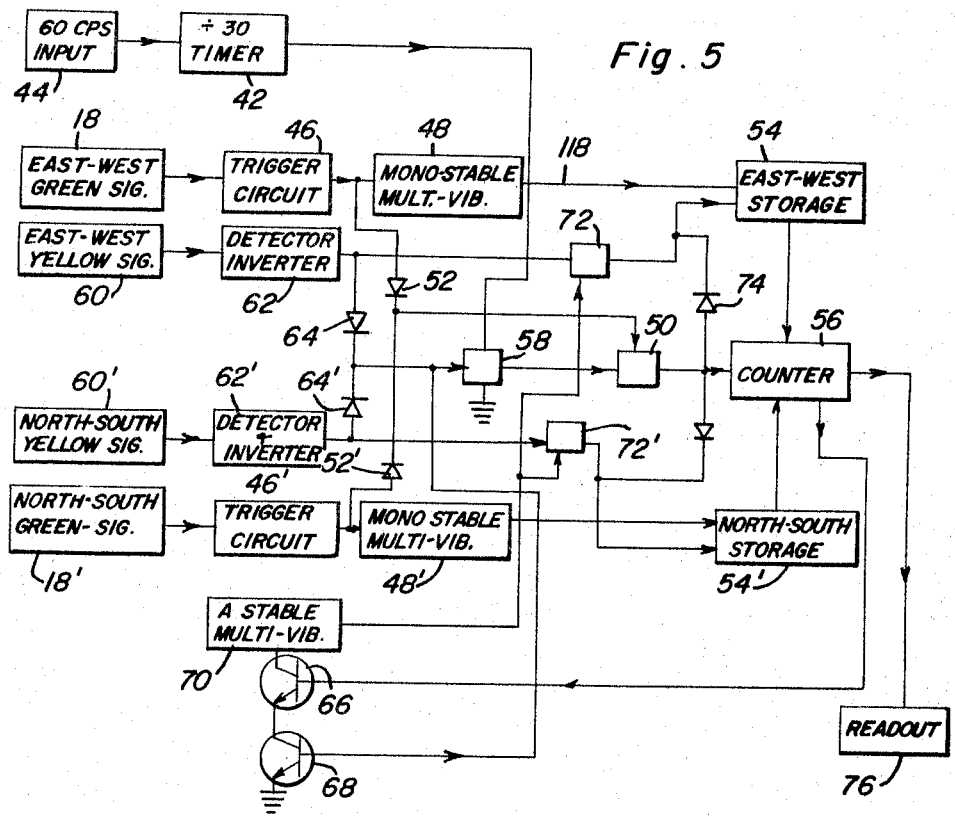
FIGURE 5 is a block circuit diagram of the control system associated with the time informing device.

FIGURE 5 is a circuit block diagram of the control system associated with the time informing device 10 as shown in FIGURES 1 through 4. A time base for the system is established by a timer component 42 which develops two pulses a second from the usual 60 cycle per second alternating current power supply 44 usually available for operation of the traffic signalling lamp assembly. When a green signal lamp 18 goes on such as the signal lamp associated with the east-west direction, a square pulse is developed by the trigger circuit 46 to which the green signal lamp 18 is connected. The square pulse output of the trigger circuit switches on a monostable multivibrator 48 and opens the gate 50 to which it is coupled by the diode 52. The output of the monostable multivibrator 48 supplies a transfer signal to a storage unit 54 associated with the illumination period of the signal lamp 18. The information stored in the storage unit 54 is thereby transferred to the counter component 56 which is connected in common to the storage unit 54 and the storage unit 54' associated with the signal lamp 18'. The green signal lamp 18' of course directs traffic in a perpendicular direction such as the north-south direction relative to the direction associated with the signal lamp 18. The counter component 56 is therefore so conditioned by the information transferred thereto from one of the storage units at the beginning of an illumination period as to limit its counting operation to a period of time which is the difference between its maximum counting period and the illumination period of the signal lamp being counted. The counter therefore receives timing pulses originating at the timer 42 during the illumination period of the signal lamp 18 for example. The timing pulses from the timer are applied to the normally opened gate 58 to close this gate and pass the timing pulses through the open gate 50 to the counter. While the timing pulses are being fed to the counter they are also fed through diode 74 to the storage unit 74 so that its storage period capacity will be depleted. At the end of the illumination period for the signal lamp 18, the yellow signal lamp 60 goes on, this being detected by the detector and inverter circuit 62. An output from the detector and inverter circuit is then dispatched through diode 64 to the gate 58 causing it to open and thereby preventing the passage of any timing pulses through the gate 50 to the counter 56. Thus, the counting operation of the counter stops. If at this instant, the counter is not in a correct state, a no-zero signal is dispatched to the switching transistor 66 so as to render it conductive. When gate 58 is open the transistor 68 connected thereto is also switched on so that the no-zero signal supplied to the transistor 68 will trigger the astable multivibrator 70 into operation. The output of the astable multivibrator will therefore supply pulses at a substantially higher pulse rate than the timing pulses developed by the timer 42. These pulses are then passed through the gate 72 to the storage unit 54, the gate 72 being opened by the output from the detector and inverter circuit 62. The pulses supplied to the storage unit 54 and derived from the astable multivibrator 70 are also supplied to the counter 56 so that both the storage unit 54 and the counter 56 will be simultaneously corrected until the no-zero signal output from the counter 56 is removed causing the transistor 66 to switch off and thereby stopping operation of the astable multivibrator 70. The storage unit 54 will then be in a condition corresponding to the illumination period of the signal lamp 18 just completed so that upon the beginning of the next cycle, it may transfer this stored information to the counter 56 when the transfer signal is supplied to the storage unit from the monostable multivibrator 48 as aforementioned. While the counter 56 is counting the timing pulses as aforementioned during the illumination period of the signal lamp 18, it supplies readout signals to the readout component 76. The foregoing sequence of operations described in connection with the signal lamp 18 occurs in the same fashion with respect to the signal lamp 18' which is therefore also associated with a yellow signal lamp input 60', trigger circuit 46', detector and inverter circuit 62', monostable multivibrator 48', diodes 52', 74' and 64', and gate 72'.

Figure 7:
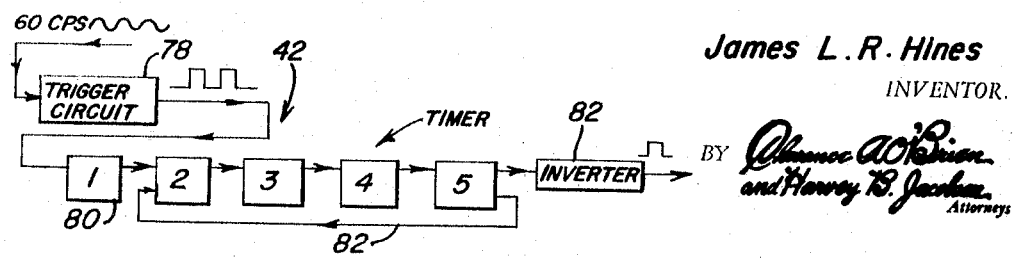
FIGURE 7 is a block circuit diagram of the timer associated with the control system.

As aforementioned, the time base for the control system does not rely upon any external timing information but instead relies upon the usually fixed frequency of the alternating current power supply in order to develop timing pulses of the proper duration. Accordingly, the 60 cycle per second input as shown in FIGURE 7, is supplied to a trigger circuit 78 such as a Schmitt circuit so that its sinusoidal waveform may be converted into a train of square pulses of the same frequency, the pulses being of a sufficient level and duration to switch a bistable multivibrator between its two stable states. Accordingly, a plurality of multivibrators are associated with the timer component 42 so as to form five binary stages 80 disposed in a frequency dividing arrangement. As is well known, the input frequency of the pulses supplied to the first binary stage will produce an output from the last binary stage at a substantially lower frequency which is the input frequency divided by $2^n$, where $n$ is the number of binary stages. Where a feedback path is established between the last stage and one of the intermediate stages such as the second stage to which feedback path 82 is connected, the frequency division is reduced by two. Accordingly, in the arrangement illustrated in FIGURE 7 the 60 cycle per second input is divided by 30 to produce two timing pulses from the last or fifth binary stage. The output pulses from the last binary stage, are inverted by the inverter circuit 83 in order to produce two negative timing pulses per second.

A typical bistable multivibrator is shown in FIGURE 11 including a pair of NPN transistors 84 and 86 having their emitters connected in common to ground through resistor 88 while a positive bias is applied respectively to the collectors through resistors 90 and 92. The bases and collectors of the transistors are also cross coupled by RC networks 94 and 96 so as to establish a forward bias on the base relative to the emitter of one of the transistors. Accordingly, only one transistor will conduct while the other is nonconductive. A negative trigger pulse may therefore be applied through the pulse steering capacitor 98 and diodes 100 and 102 to the conducting transistor so as to switch it off temporarily removing the reverse bias on its collector relative to its emitter. This increases the forward bias on the non-conducting transistor causing it to switch on. A positive output voltage will therefore appear at the output collector 104 of transistor 86 after every other successive trigger pulse. Bistable multivibrators of this type are therefore utilized in the binary stages 80 of the timer component as well as in the binary stages associated with the storage units 54 and 54'.

Figure 6:
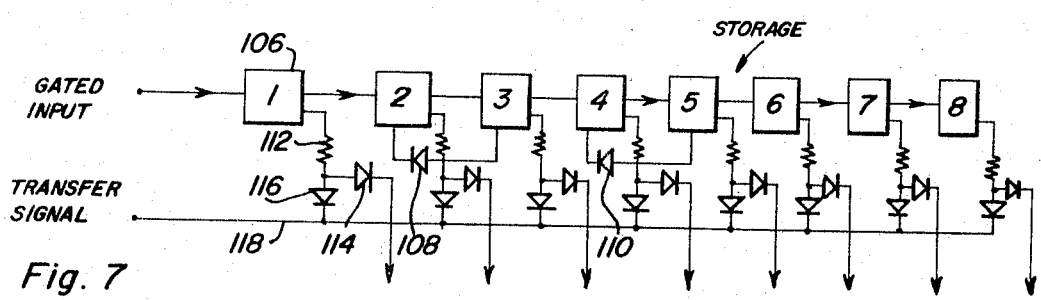
FIGURE 6 is a block circuit diagram of one of the storage units associated with the control system.

Each of the storage units as shown in FIGURE 6, includes eight binary stages in a frequency dividing arrangement. The frequency dividing arrangement of the binary stages 106 in the storage units however are modified by the provision of feedback paths through diodes 108 and 110 between the third and second binary stages and between the fifth and fourth binary stages. A frequency division of 128 is thereby attained so that an output pulse from the last binary stage will occur every 72 seconds when the first binary stage is supplied with two timing pulses each second. Accordingly, the storage units have a maximum timing period of 72 seconds which necessarily exceeds the illumination period of the traffic signalling lamps to be timed. Therefore, prior to a timing cycle, the storage units are set at a time condition reflecting a timing period of 72—X seconds, where X=the lamp illumination period. The output of each binary stage 106 is also coupled by a resistor 112 and diode 114 to a corresponding stage in the counter component 56 as will be hereafter described. Also connected to each of the binary stage outputs through a diode 116, is a transfer signal line 118. Accordingly, when the positive voltage held on line 118 is removed by a transfer signal, the positive outputs from the binary stages will be supplied through the diodes 114 to the corresponding stages in the counter component in order to transfer the stored information to the counter before its counting cycle begins.

The transfer signal line 118 is therefore connected to the output transistor 120 in the monostable multivibrator 48 as shown for example in FIGURE 12. The transfer line 118 and the output collector are maintained at a relative low voltage in the normal state of the transistor 120, the base of which is saturated by the positive voltage supplied from line 122 through the resistor 126 and diode 128. The transistor 120 is maintained in this condition because of the resistor 130 regulating the relative potential held on the emitter and base. When a negative back bias is applied to diode 128 to hold a cut off on the base of transistor voltage 120, the transistor becomes non-conductive and a higher voltage is supplied to transfer signal line 118 through resistor 124. The negative voltage back biasing diode 128 is supplied for a predetermined interval by discharge of capacitor 132 forming a timing circuit with resistor 126. Thus, when capacitor 132 is discharged, transistor 120 is saturated once again to remove the higher voltage pulse from line 118. Capacitor 132 is however charged through resistor 134 only when a saturating voltage is supplied to the base of transistor 136 causing it to switch on. The trigger circuit 46 is therefore coupled to the base of the switching transistor 136 so that when a trigger pulse is applied to its base through the resistor 138, transistor 136 will be switched on for a duration determined by the time constants of the trigger circuit 46. Timing information is thereby transferred between the binary states of the storage unit and the counter as aforementioned as long as the lamp 18 is illuminated. Accordingly, the signal lamp 18 is connected to the trigger circuit 46 so that when it is illuminated A.C. voltage will be detected through diode 154 to saturate the base of transistor 142. The emitters of transistor 140 and signal transistor 142 are connected in common to ground through resistor 144. The base bias of transistor 140 relative to the emitter is established through the voltage dividing network including the resistors 146 and 148 so as to normally hold the transistor 140 conductive. When a rectified voltage is applied to the base of transistor 142 through coupling resistor 150, a pulse having a duration determined by the time constants of capacitor 152 and resistor 153 is supplied to the base of transistor 140 to hold it non-conductive as long as the lamp 18 is on. The signal voltage applied to the base of transistor 142 is obtained from the A.C. voltage applied to the signal lamp 18 after it is rectified by diode 154 and filtered by the filter capacitor 156. Thus, the transfer signal output supplied to line 118 is obtained during the illumination period of signal lamp 18, the transfer signal being removed upon extinction of the lamp 18 when the monostable multivibrator 48 returns to its stable state.

Also, at the end of the illumination period of the signal lamp 18, the yellow signal lamp goes on so as to supply a signal voltage to the base of transistor 158 in the detector and inverter circuit as shown in FIGURE 13. The signal output of transistor 158 is inverted by supply to the base of transistor 160 when switched on by pulses supplied thereto from the yellow signal lamp after being rectified by the diode 162 and filtered by the filter capacitor 164. The output of transistor 160 is thereby operative to open gates 58 and 72 in order to stop the counting operation of the counter and to pass correcting pulses from the astable multivibrator 70 to the storage unit as aforementioned.

Referring now to FIGURE 8, it will be observed that the timer component 42 is coupled by resistor 166 to the collector transistor 168 in the gate circuit 58 so that when the transistor 168 is in an off condition, the timing pulses will be applied to the base of transistor 170 in gate circuit 50. If transistor 172 is then switched on, a grounded signal path is established for supplying amplified timing pulses from the collector of transistor 170 to the counter component 56. The transistor 172 is therefore switched on in order to open the gate circuit by the output of trigger circuit 46 or 46' respectively supplied to the base of transistor 172 through diodes 52 or 52'. At the end of the illumination period for the green signal lamp, an output from the detector and inverter circuit is developed as aforementioned and supplied through resistor 174 to the base of transistor 176 in the gate circuit 72 for example. Alternatively, the detector and inverter circuit 62' supplies an output signal to the base of transistor 173 in the gate circuit 72'. The transistor 176 or 178 is therefore switched on in order to open the gate circuit 58 by amplifying the pulses supplied by the detector and inverter circuit. The collectors of the transistor 176 or 178 are therefore isolated by load resistor 180 and 182 from the storage units 54 and 54' which may then be pulsed under control of the transistor 184 connected to the output resistors 180 and 182 by diodes 186 and 188. The controlling transistor 184 is also connected by the diode 190 to the output collector of transistor 170. Accordingly, transistor 184 is intermittently switched on and off by pulses supplied to its base in order to deplete the timing period of the counter and correct that storage unit 54 or 54' to which the conducting transistor 176 or 178 is connected, these pulses being supplied at a substantially higher pulse rate than the timing pulses in order to rapidly correct the condition of the counter and the storage unit at the same time. The transistor 184 is therefore switched on and off at a rapid rate at the end of the illumination period for the green lamp if a no-zero signal switches on the transistor 66 as aforementioned. The output from transistor 176 or 178 is then supplied through the diode 64 or 64' to the base of transistor 168 of gate 58 causing it to switch on in order to substantially ground the base of transistor 170 thereby closing gate 50 to terminate the counting operation of the counter 56. At the same time, the amplified output of the detector and inverter circuit is supplied from transistor 176 or 178 through diode 192 or 194 and zener diode 196 to the base of transistor 68 causing it to switch on and thereby establishing a signal path to the astable multivibrator 70 through which an amplified no-zero signal from the counter is conducted. The no-zero signal is thereby operative to trigger the astable multivibrator into operation since the collector of the transistor 68 is connected in common to the emitters of the transistors 198 and 200 having their bases and collectors cross coupled by the capacitors 202 and 204 so that when one transistor is conducting, the other is non-conductive. The bases and collectors of the transistors are therefore supplied with relative bias voltages from the positive voltage line 206 producing an output pulse of a relatively high frequency at the collector of transistor 198. The output pulses are differentiated by the RC network 208 so as to supply sharp pulses to the base of amplifying transistor 210 from which the amplified output is further sharpened by the RC network 212 before being supplied to the base of transistor 184 causing it to switch on and off as aforementioned. Thus, the counter is pulsed until its maximum timing period is depleted and the no-zero signal removed from the signal line 214. Since initially the period countered by the counter corresponds to the illumination period of the green lamp, the remaining period depleted by the pulses derived from the astable multivibrator 70 will be equivalent to the difference between the maximum timing period of the counter and the illumination period. Accordingly, the pulses derived from the astable multivibrator will simultaneously set the storage unit, which is also being pulsed, to the difference between the maximum timing period thereof and the illumination period. Thereafter, any timing errors will be similarly corrected at the end of each illumination period.

Referring now to FIGURE 9, it will be observed that the counter 56 includes eight binary stages disposed in a frequency dividing arrangement for coupling to the corresponding stages of the storage units as aforementioned. Accordingly, as the counter is counting the timing pulses during an illumination period, its timing period will be depleted simultaneously preventing depletion of the storage unit to which the transfer signal is applied and to which the respective counter stages are coupled by the diodes 114. The first stage of the counter therefore receives timing pulses at the rate of two per second from the gate circuit 50 during the illumination period. If at the end of the illumination period, the maximum timing period of the counter is not depleted, a positive output voltage will remain in the signal line 214 inasmuch as each of the binary stages 216 is connected by a diode 218 to the signal line. Accordingly, the no-zero signal remains in the signal line 214 until the maximum timing period for the counter is depleted.

It will be observed, that the binary stages 216 of the counter are arranged in a manner similar to the arrangement described with respect to the storage unit so that feedback paths 220 and 222 are established between the third and second stages and between the fifth and fourth stages. Since two pulses per second are supplied to the first stage of the counter upon opening of gate 50, no pulse will appear at the output of the second stage and following stages of the counter during the first second interval of the illumination period, during which interval the first stage only is switched on by the second pulse. During the second interval, the third pulse switches off the first stage and switches on the second stage so that an output pulse is then derived only from the second binary stage. This output pulse is conducted through output line 224 to a binary-to-decimal converter 226 as shown in FIGURE 9. During the third second interval, the fourth pulse switches on the first stage, switches off the second stage and switches on the third stage. However, the feedback path 220 from the third to the second stage turns back on the second stage during the third interval. Thus, during the third interval, output pulses are conducted through both the output line 224 and a second output line 228 from the third stage of the counter. Output lines 230 and 232 are also connected to the outputs of the fourth and fifth stages. Binary outputs will accordingly appear in the four output lines during nine timing intervals in accordance with a predetermined code pattern more fully charted in FIGURE 10. The converter 226 recognizes the binary code pattern to effect a conversion to a decimal output in the form of energizing pulses supplied to different combinations of nine output lines. The nine output lines are therefore respectively connected to different sets of bulbs including the single bulb set 234, the double bulb set 236, the triple bulb set 238, the double bulb set 240, the double bulb set 242, the triple bulb set 244, the double bulb set 246, the double bulb set 248 and the triple bulb set 250. The binary outputs from the second, third, fourth and fifth stages of the counter form a binary code corresponding to a decimal digit number formed by the arrangement of the bulbs 34 on the display panel member. For example, when only the fourth and fifth stages of the counter 56 produce output pulses in lines 230 and 232, seven intervals will have been counted leaving three intervals remaining in the illumination period. The output pulses in lines 230 and 232 will therefore produce energizing pulses in seven of the nine output lines of the converter 226 causing energization of bulb sets 234, 236, 238, 242, 244, 248 and 250. Illumination of the latter bulb sets will thereby display the figure 3 on the panel member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a traffic signal assembly having a directional lamp illuminated for an illumination period by a source of current alternating at a predetermined frequency, a time informing device mounted by said signal assembly comprising, time base establishing means connected to said source of current for developing timing pulses at a relatively low pulse rate having a fixed ratio to said predetermined frequency, storage means having a maximum timing period exceeding said illumination period, gate means rendered operative to supply pulses to the storage means for depleting the timing period stored therein, counter means operatively connected to the gate means for counting the timing pulses developed during said illumination period, transfer means connecting the storage means to the counter means during said illumination period for limiting the count of the counter means to said timing period of the storage means and preventing depletion of the timing period of the storage means, signal detecting means connected to the gate means for stopping supply of timing pulses to the counter means and the storage means upon termination of the illumination period, correcting means rendered operative in response to said termination of the illumination period for supplying pulses at a relatively high pulse rate to the storage means and the counter means until the maximum timing period of the counter means is depleted, output means connected to said counter means for establishing binary code information, and display means operatively connected to said output means for producing illuminated digits in response to establishment of said binary code information.

2. The combination of claim 1 wherein said counter means includes a plurality of binary stages in a frequency dividing arrangement, feedback paths interconnecting some of said binary stages, said output means being connected only to the binary stages interconnected by the feedback paths for supply of the binary code information to the display means.

3. The combination of claim 2 wherein said storage means includes a plurality of bistable multivibrators interconnected in a frequency dividing arrangement to define the maximum timing period in terms of the timing pulses.

4. The combination of claim 3 wherein said correcting means comprises, an astable multivibrator connected to the gate means and rendered operative for supplying said pulses at the high pulse rate to the counter means and the storage means, means responsive to said termination of the illumination period prior to depletion of the maximum timing period in the counter means for triggering the astable multivibrator into operation, whereby said storage means stores a number of pulses equivalent to the difference between said maximum timing period and the illumination period prior to the following illumination period of the directional lamp.

5. The combination of claim 1 wherein said correcting means comprises, an astable multivibrator connected to the gate means and rendered operative for supplying said pulses at the high pulse rate to the counter means and the storage means, means responsive to said termination of the illumination period prior to depletion of the maximum timing period in the counter means for triggering the astable multivibrator into operation, whereby said storage means stores a number of pulses equivalent to the difference between said maximum timing period and the illumination period prior to the following illumination period of the directional lamp.

6. In combination with a traffic signal assembly having a directional lamp illuminated for an illumination period by a source of current alternating at a predetermined frequency, a time informing device mounted by said signal assembly comprising, illuminating display means forming digits during said illumination period, electronic circuit means energized by said source of current for illuminating and changing the digits of the display means, and timing means responsive to said predeterminned frequency of the source of current for regulating formation of said digits at equal intervals during said illumination period.

7. The combination of claim 6 wherein said display means comprises, a panel, a plurality of bulbs mounted on the panel, said bulbs being grouped in sets of one, two and three for simultaneous illumination of the bulbs in the respective sets, said circuit means having a current carrying connection to each of said sets so that illumination of different combinations of said sets will form the digits on the panel.

No references cited.

NEIL C. READ, *Primary Examiner.*

THOMAS B. HABECKER, *Examiner.*